United States Patent [19]

Sundberg

[11] 4,224,689
[45] Sep. 23, 1980

[54] APPARATUS FOR SMOOTHING TRANSMISSION ERRORS

[76] Inventor: Carl-Erik W. Sundberg, Vildandsvägen 24C, 222 34 Lund, Sweden

[21] Appl. No.: 948,304

[22] Filed: Oct. 3, 1978

[30] Foreign Application Priority Data

Oct. 11, 1977 [SE] Sweden .............................. 7711384

[51] Int. Cl.² .......................... G08C 25/00; G06F 11/00
[52] U.S. Cl. ............................................ 371/6; 371/31; 375/76
[58] Field of Search ................... 340/146.1 R; 325/41, 325/42, 323; 328/115; 329/109; 179/1 SA

[56] References Cited
U.S. PATENT DOCUMENTS

| | | | |
|---|---|---|---|
| 3,386,079 | 5/1968 | Wiggins | 340/146.1 R |
| 3,621,139 | 11/1971 | Gibson | 178/69 B |
| 3,631,520 | 12/1971 | Atal | 179/1 SA |
| 3,849,761 | 11/1974 | Kasahara et al. | 340/146.1 R |
| 4,054,863 | 10/1977 | Goodman et al. | 340/146.1 R |

OTHER PUBLICATIONS

Sundberg, Soft Decision Demodulation for PCM Encoded Speech Signals, IEEE Transactions on Communications, vol. COM 26, No. 6, Jun. 1978, pp. 854–859.
Jayant, Average and Median-Based Smoothing Techniques for Improving Digital Speech Quality, IEEE Transactions on Communications, Sep. 1976, pp. 1043–1045.

Primary Examiner—Charles E. Atkinson
Attorney, Agent, or Firm—Burns, Doane, Swecker & Mathis

[57] ABSTRACT

An apparatus for smoothing transmission errors in a receiver in order to compensate for digital errors occurring in a transmitted signal. The apparatus includes a device to generate an output signal, which corresponds to the signal transmitted by the transmitter with a high degree of probability. The device includes a device in which a predetermined number of bits are detected and an evaluation is made whether each received bit exceeds or falls below a predetermined threshold value. For each bit or group of bits which is detected and falls below said threshold value, the redundancy of bits in the signal is used to determine the correct value of the detected low value bit. From this, a bit signal is generated which more closely corresponds to the value of the bit transmitted by the transmitter than to the received value.

11 Claims, 11 Drawing Figures

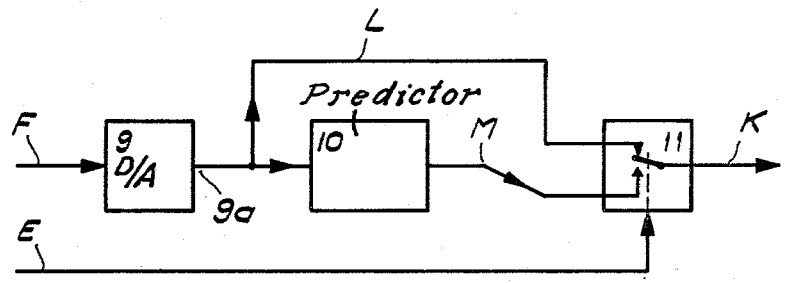
Fig.7
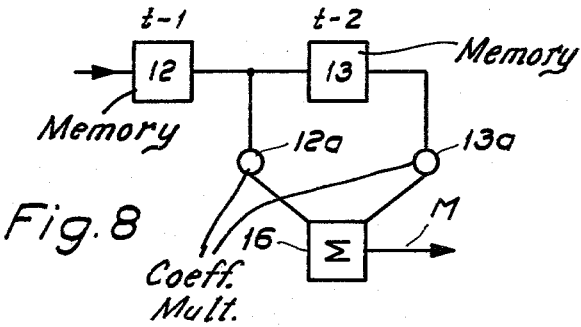
Fig.8
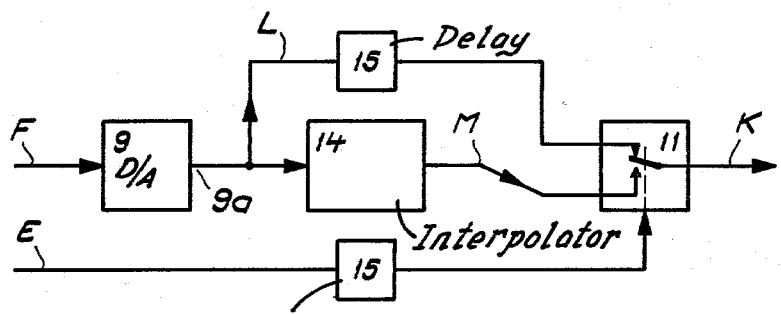
Fig.9
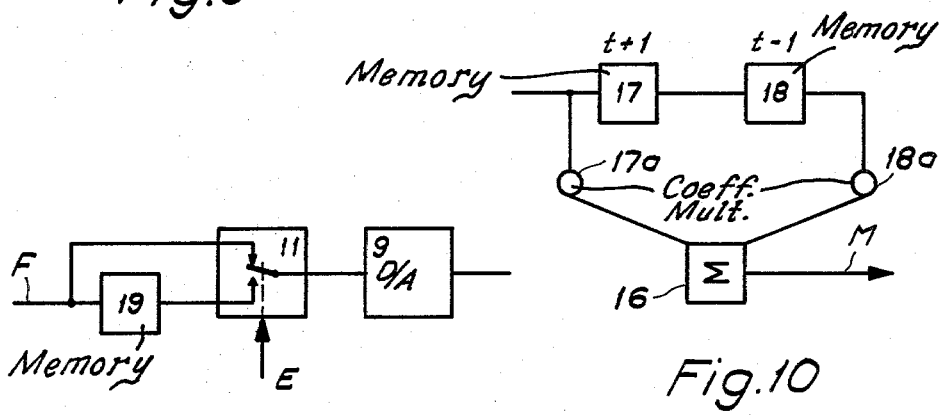
Fig.10
Fig.11

APPARATUS FOR SMOOTHING TRANSMISSION ERRORS

FIELD OF THE PRESENT INVENTION

The present invention relates to a receiver apparatus, which has the ability of smoothing transmission errors. More specifically, by adding this apparatus to the receiver, the effect of transmission errors can be reduced without any changes in the transmitter due to the changed receiver arrangement. This invention is especially useful for smoothing digital errors in a transmitted digital signal. By smoothing the received signal, the receiver output signal will, with a higher probability, be closer to the transmitted signal than otherwise it would have been without using the present received signal smoothing apparatus.

OBJECTS OF THE PRESENT INVENTION

The basic idea in this invention is the utilization of two independent principles, which combined gives a smoothing effect to the receiver output signal, thus reducing the effect of transmission errors. The first of these two concepts is "soft decision demodulation" which means that the reliability, i.e. the signal amplitude, for the signals corresponding to a predetermined number of bits is compared to a predetermined threshold value. If the signal voltage is above this threshold value, the corresponding bit is considered to be reliable. This bit is used as reliable and correct information by the receiver (although if with low probability it might be in error). If the signal voltage is below the threshold value an extra signal is generated, indicating that this bit (or group of bits) is unreliable. These unreliable bits will be processed by the smoothing apparatus in the receiver and if this procedure reveals that the unreliable bits more likely should have different values than the received ones, then the unreliable bits are replaced ("correct") by the more likely values, calculated by the receiver. The soft decision demodulation principle makes it possible to indicate the bit position of likely transmission errors (caused by transmission channel imperfections), independent of the actual bit value. The reliability of the received signals is a function of the noise in that specific signal.

By "hard decision demodulation" is meant that the receiver demodulator produces no reliability information about the received bits, i.e. the signal voltage is above or below a certain threshold (or thresholds) voltage(s).

The second principle used in this invention is that for every unreliable bit or group of bits (i.e. for which the decision voltage in the soft decision demodulator was below a predetermined threshold) the redundancy of the bits in the bit stream is used in the smoothing process for determining the most likely value of the unreliable bit or group of bits. The actual received unreliable value of a bit or a group of bits is replaced by the more likely values calculated by the smoothing apparatus.

More specifically, this invention relates to a method for smoothing (reducing the effect of) digital transmission error in PCM (Pulse Code Modulation) encoded speech signal transmitted over a noisy channel. Unreliable bits, groups of bits or the entire PCM words, are identified by the soft decision demodulator. It is advantageous to concentrate the identification of potential digital errors to the most significant bits in the PCM word, because the effect of digital errors is more severe in these bits than in the others. In the implementation examples below, the whole PCM word is replaced, if any of the most significant bits is found unreliable. The PCM word which is replacing the unreliable word is generated from a predetermined number of previous PCM words (prediction), if delayed decisions are used, by the receiver from a predetermined number of previous PCM words and PCM words following after the unreliable one (interpolation). By this process a more likely value of an unreliable bit or PCM word is produced by the receiver smoothing apparatus.

BACKGROUND OF THE PRESENT INVENTION

Various methods for detecting, locating and compensating digital errors have been published. Among such methods should be mentioned the use of error correcting and detecting codes. With this method control bits are added to the information bits for introducing error correction capability. Very powerful schemes can be obtained but the disadvantage with this method is that the transmitter must be modified to include the transmission of the control symbols. This disadvantage is eliminated by the present invention. The error smoothing apparatus is optional at the receiver. Thus it can be added to an already existing system without modifying the transmitter.

Furthermore, methods have been suggested which use the inherent redundancy in the bit stream both for identifying potential digital errors and for smoothing the effect of such errors. These schemes are also optional at the receiver without changing the transmitter but they are only using hard decision demodulation, thus not using the principle of unreliable bits identified by the soft decision demodulation. Such a receiver does not fully utilize all the potentially available information about error locations. Thus the error smoothing capability of such a device is suboptimal.

BRIEF DESCRIPTION OF THE ACCOMPANYING DRAWINGS

The attached drawings show a presently considered implementation based on the significant principles of this invention. More specifically FIG. 1 shows in "a" a correct reliable digital word and in "b" a second unreliable digital word, FIG. 2 shows in schematic form a receiver device producing hard decision demodulated symbols, FIG. 3 shows in schematic form a receiver device based on the soft decision demodulation principle, generating an extra signal from the output circuit when the decision voltage is below a predetermined threshold value, FIG. 4 shows a diagram giving the threshold ("erasure zone") for the decision voltage, FIG. 5 shows a block diagram of the parts in the output circuit of the soft demodulator in FIG. 3.

FIG. 7 shows a block diagram of the subsystems used for predicting a likely value of a given unreliabe word based on the redundancy of the bit stream, FIG. 8 shows a block diagram of the predictor in FIG. 7.

FIG. 9 shows a block diagram of the subsystems used for interpolating a likely value of a given unreliable word based on the redundancy of the bit stream, FIG. 10 shows a blockdiagram of the interpolator in FIG. 9 and FIG. 11 shows a method where the replacement of an unreliable word takes place before the PCM decoder (demodulator).

DESCRIPTION OF A PREFERRED EMBODIMENT

Figure 1:

The significant properties of the invention will now be described with reference to the attached drawings. The reference numerals used below are those shown in the drawings.

FIG. 1 shows in "a" the word format used in the following description of the invention. The binary word is 10110100. FIG. 1 shows in "b" another binary word 11110100, where bit number "2" is different from the one in "a". This corresponds to a channel error causing a digital error in bit position "2". It is assumed that bit number "1" is a sign bit and bit number "2" the most significant PCM bit, bit number "3" the next most significant PCM bit, etc. In this example, the digital error has occurred in the bit position where the effect of the error is most severe.

Figure 2:
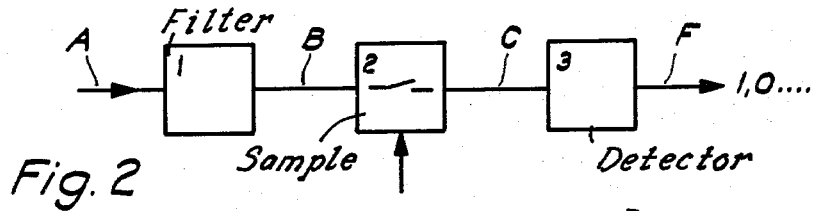

FIG. 2 shows in the form of a block diagram a receiver circuit producing digital (binary) information from the received waveforms. This receiver is operating according to the hard decision demodulation principle. The receiver circuit consists of a matched filter 1 which is matched to the received waveforms on connection "A". This filter is connected to a sampling circuit 2 which in turn is connected to a detection circuit 3, which produces binary output signals based on the sampled analogue voltage from 2. This receiver is previously well known and is not the subject of this invention. It should be emphasized that the circuit 3 produces digital information on connection F without attaching reliability (quality) information about the digits, i.e. whether the received waveform was weak and distorted by noise, or whether it was distinct and strong.

Figure 3:
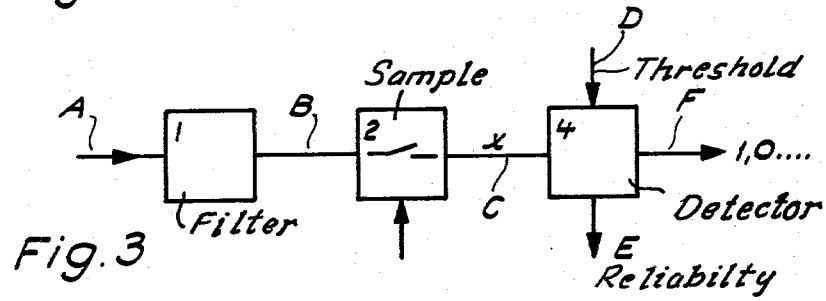

FIG. 3 shows a block diagram of a receiver with output digital information which gives reliability information, i.e. a receiver which operates according to the soft decision demodulation principle. This means that the detector 4 not only produces binary information on connection "F" but also supplies reliability information on connection "E". If one or more of the significant bits corresponds to a matched filter sampled voltage "X" which is low, i.e. this voltage is in the zone $-T$, $+T$ in FIG. 4, an indication of low reliability is produced by the detector 4 on connection "E". The value of the threshold voltage T is adjusted and fed to detector 4 on connection "D". Note in FIG. 4, that $+V$ corresponds to a sampled matched filter voltage occuring from a waveform which, without added noise, corresponds to a transmitted binary digit "1" and that $-V$ corresponds to a sampled matched filter voltage occuring from a waveform, which without added noise, corresponds to a transmitted binary digit "0".

From the filter 1, the signal is fed on connection "B" to the sampling device 2 and from there to the detector circuit 3, or alternatively to the detector 4, on connection "C".

Figures 4, 5:
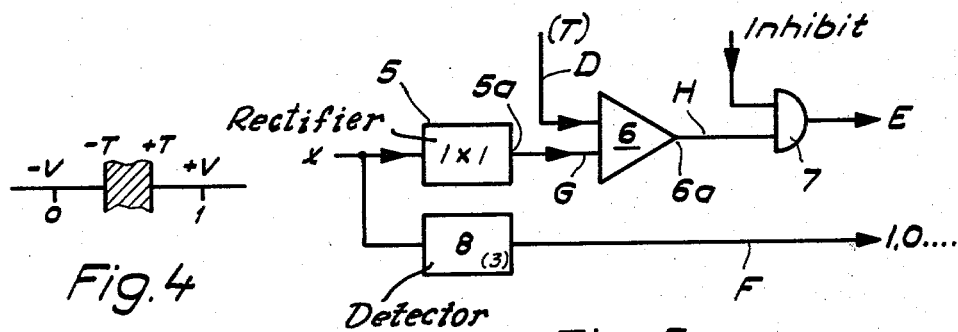

FIG. 5 shows how the unit 4 in FIG. 3 processes the signal "X" on connection "C". This signal is fed into a binary hard decision detector 8. This unit produces binary digits and is identical to the detector circuit 3 in FIG. 2.

The signal "X" is also fed into a rectifier 5. Its output is connected to a comparator 6 via connection "G". The threshold voltage "T" is also connected to the comparator 6. The output 6a is high as soon as the value of the voltage on connection "G" is above the threshold voltage "T". The output 6a is connected via connection "H" to the input of an AND-gate 7. The other input of this gate is fed by an inhibit signal (FIG. 6c) which governs the time interval when a signal can occur on the output connection "E". In this case, the inhibit signal is such that the unreliability signal on "E" can only occur during the first 3 PCM bits, i.e. the most significant bits 101. By choosing the duration of the positive part of the inhibit signal, the number or significant bits affecting the reliability signal E can be varied.

Figure 6:
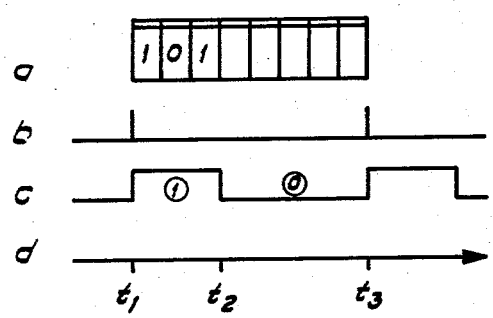
FIG. 6 shows the timing of the word format, the word synchronization and the inhibit signal.

FIG. 6d denotes the duration t2-t1 of the positive part of the digit one.

The word synchronization pulses in 6b occurs at time t1 and t3. These pulses are standard in a word synchronization scheme in an ordinary PCM transmission system.

The aim of this invention is to supply a solution to the problem of correcting the digital transmission error(s).

It is assumed that the word in FIG. 1a is the transmitted PCM word. Furthermore, it is assumed that the word in FIG. 1b is the received word after device 4 in FIG. 3, i.e. the output on connection "F" in FIG. 5. Due to bad transmission conditions, the sample voltage corresponding to bit number 2 is in the erasure zone $-T$, $T$ in FIG. 4. Thus an unreliability indication is obtained on connection "E" for this received word. With the above in mind, FIGS. 7–10 will now be described.

The received digital PCM words are fed into a PCM decoder 9. This device (which is a D/A converter) converts the digital word to an analog voltage 9a, which is dependent on the digital input word. When no unreliability signals are pesent on connection E, the signal level from the PCM decoder is connected via "L" and via a switch 11 to the output "K". The voltage level is also stored in 10, which is the predictor which is used to replace unreliable PCM signal samples (words). From a predetermined number of previous bits in a single or several previous PCM words and from the corresponding voltage levels the most probable or at least a more probable value can be determined for an unreliable bit or word.

Let a word with an active signal on connection "E", i.e. an unreliable word, be received, e.g. the binary word in FIG. 1b with an unreliable 2nd bit. The signal on "E" is a detection of a potential error. It is also a switch command to the switch 11. The signal level is replaced by a predictor 10 estimate "M" which is connected to the output "K".

In the predictor memory, the voltage corresponding to the previous PCM word is stored. For simplicity, assume that this digital word is that in FIG. 1a. This PCM sample is stored in memory 12 (t−1). It corresponds to a delay of 1 sample interval. The sample before that (t−2) is stored in memory 13. The two voltages are multiplied by coefficients, in 12a and 13a respectively, and an average is formed at the output of the adding circuit 16. This resulting average, the predictor output, is connected via "M" to the switch 11. FIG. 8 only shows an example of a simple linear predictor. More than two storage units can be used and the coefficients 12a, 13a can be constant or vary with the received signal samples.

FIGS. 9 and 10 show an alternative design compared to FIGS. 7 and 8, respectively.

The circuit 14 is constructed in such a way that the PCM samples and the signal redundancy can be utilized to replace unreliable bits or the entire unreliable PCM word by interpolated bits or PCM samples calculated from one or several previous bits or words and one or several subsequent (following) bit or words relative to the unreliable bit, bits or word.

Since the interpolation circuit 14 utilizes future bits and samples relative to the actual considered unreliable PCM word, delayed decisions are required. Thus delays 15 are introduced in connections "E" and "F". If one word after the unreliable word is to be used in the interpolation circuit, the delay has to be 1 PCM sample interval, i.e. the time interval between t3 and t1. If two subsequent words are to be used by the interpolator, the delay should be doubled, etc.

FIG. 10 shows an example of an interpolator using two samples, i.e. one after and one before the unreliable PCM word (sample). The memory 17 stores the subsequent sample voltage (t+1) and the memory 18 stores the sample voltage corresponding to the PCM word previous (t−1) to the unreliable PCM word(s).

The two voltages are multiplied by coefficients 17a and 18a and combined in 16, in the same manner as before in FIG. 8, the interpolator output voltage is connected via "M" to the switch 11.

It is clear that in both embodiments in FIGS. 7 and 9 the voltage corresponding to the erroneous PCM-word 1b will be approximately corrected if the samples contain enough redundancy.

In the design examples in FIGS. 7-10 it has been assumed that the erroneous unreliable PCM word is replaced by an estimate calculated from two adjacent samples. A simplification is that the unreliable word (sample) simply is replaced by the previous adjacent word (sample).

FIG. 11 shows an example of a design where the binary PCM word on connection "F" is fed to the switch 11 and to the memory 19. If an unreliable word (or bit) is detected, the memory 19 is connected to the output via switch 11. The unreliable word (or bit) is replaced by the content of the memory 19. The switch output is in this case a digital PCM word. This is converted to an analog voltage in the PCM decoder 9.

The memory 19 can be replaced by more advanced digital predictors operating on a large number of previous PCM samples. The design of FIG. 11 can also be modified to use the interpolation principle.

The invention is of course not limited to the design examples above. Modifications of the designs above within the scope of the concept of the invention are also included.

In FIGS. 8 and 10, only two samples are used in the predictor and interpolator respectively. More samples and variable predictor/interpolator coefficients are, of course, also possible within the scope of this invention.

In the designs above, the threshold T was kept constant for a group of bits. However, since the effect of the digital errors vary with the significance of the bit in the PCM-word, the threshold value T should be matched to the bit position in an optimal design. Thus, the erasure zone is wider for more significant bits and more narrow for less significant bits.

In the devices 12a, 13a, 17a and 18a, the voltages are multiplied by a fixed predetermined coefficient or successively updated time variable signal dependent coefficients.

The theoretical concept of this invention is described in some detail in "Soft decision Demodulation for PCM Encoded Speech Signals" issued in IEEE Transactions on Communications Vol. COM-26, no. 6, June 1978, pp854-859 and in "Algorithms for reducing the effect of transmission errors in PCM encoded speech signals by means of soft demodulation techniques" issued in Conference Record pp841-845, International Conference on Communications, ICC 78, Toronto, Canada June 4-7, 1978.

What is claimed is:

1. Apparatus for smoothing transmission errors in a received signal to compensate for digital errors occurring in a transmitted signal to thereby produce a receiver output signal which resembles the signal transmitted by a transmitter with a higher degree of probability, comprising:
   means for detecting the amplitude value of a received bit relative to a predetermined threshold value and for producing an output signal when the detected value is less than said threshold value;
   means for detecting the data level of a received bit or group of bits;
   means for estimating the probable data level of a received bit or group of bits based upon the inherent bit redundancy in a received information signal; and
   switching means normally connecting said data level detecting means to an output terminal and responsive to the output signal from said threshold detecting means for disconnecting said data level detecting means and connecting said estimating means to the output terminal.

2. An apparatus according to claim 1, characterized in that only the most significant bit or bits in the received signal are detected and compared to said threshold value.

3. An apparatus according to claim 1, characterized in that said threshold value is adjustable in dependence upon the position in a word of a detected bit.

4. An apparatus according to claim 1, characterized in that said estimating means senses a predetermined number of preceding bits occurring in one or more words and from these values estimates the most probable value for a received bit or a word.

5. An apparatus according to claim 1, characterized in that detects one or more preceding bits in one or more preceding words and one or more succeeding bits in one or more succeeding words and estimates a mean value for a received bit or word.

6. An apparatus according to claim 1, characterized in that when the detected amplitude value falls below said threshold value for one or more bits in one single word, the whole word is generated by said estimating means.

7. An apparatus according to claim 1, characterized in that when a detected signal value falls below a threshold value the preceding value or word is used to estimate the most probable bit or word.

8. The apparatus of claim 1 wherein said detecting means includes means for rectifying a received signal and an amplifier having the rectified signal supplied to one input terminal thereof and a threshold signal designating a predetermined erasure zone supplied to a second input terminal thereof.

9. An apparatus according to claim 8, characterized in that an output terminal of said amplifier is connected to one input terminal of an AND-gate and a time dependent inhibit signal is connected to the second input terminal for said gate.

10. The apparatus of claim 1, further including means for demodulating the signal present at said output terminal.

11. The apparatus of claim 1, further including means for demodulating the received signal prior to the time it is presented to said output terminal.

* * * * *